United States Patent [19]

Bierly

[11] 4,090,234

[45] May 16, 1978

[54] INPUT TAP CHANGER

[75] Inventor: Meade Goodman Bierly, Elizabethtown, Pa.

[73] Assignee: AMP Incorporated, Harrisburg, Pa.

[21] Appl. No.: 731,262

[22] Filed: Oct. 12, 1976

[51] Int. Cl.² .......................................... H02M 7/155
[52] U.S. Cl. ...................................... 363/88; 323/21; 323/43.5 S
[58] Field of Search ............... 323/21, 43.5 S; 363/45, 363/46, 85, 88, 90, 128

[56] References Cited

U.S. PATENT DOCUMENTS

| 3,195,036 | 7/1965 | McNulty et al. | 323/43.5 S |
| 3,816,809 | 6/1974 | Kuster | 323/21 |
| 3,921,059 | 11/1975 | Birman et al. | 323/43.5 S |

OTHER PUBLICATIONS

Menard et al., "Voltage Regulator for Controlling a DC Motor," IBMTDB, vol. 13, No. 6, Nov. 1970, pp. 1516, 1517.

Primary Examiner—A. D. Pellinen
Attorney, Agent, or Firm—Russell J. Egan; Gerald K. Kita

[57] ABSTRACT

A noise free circuit for a transformer secondary having SCR taps which are rendered selectively conducting thereby varying the effective turns ratio of the transformer and providing an instantaneous input tap changer responsive to wide variation in input voltage.

4 Claims, 1 Drawing Figure

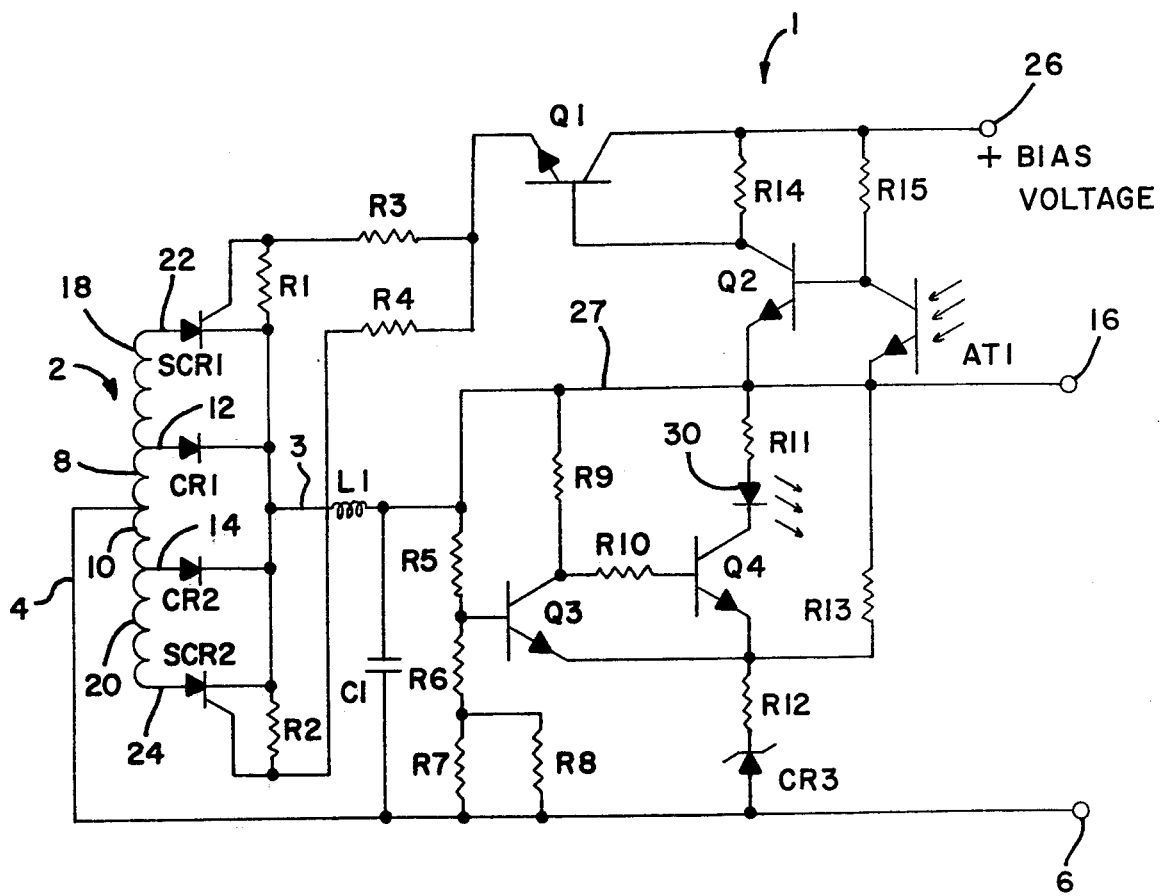

INPUT TAP CHANGER

FIELD OF THE INVENTION

The present invention relates to circuit rectification of a widely varying input voltage to produce a desired D.C. voltage output. More particularly, the present invention relates to a circuit for varying the effective tap of a transformer secondary in response to input voltage variations without generating radio frequency noise.

BRIEF DESCRIPTION

The present invention relates to the problem of producing an output voltage within a prescribed limit despite wide variations in input voltage. The use of a rectifier bridge in a transformer secondary is used for rectification of an input voltage. One or more auxiliary secondary taps are provided through corresponding SCRs the respective gates of which are connected through a transistor switch to a constant D.C. biasing voltage. A sampling circuit detects variations in the output voltage responsive to corresponding variations in input voltage. The sampling circuit is operatively connected to a transistor switch by a coupling means such as an optical coupler. When an undesired voltage variation is detected the optical coupler renders the transistor switch conductive to supply the bias voltage to the corresponding SCR gate. The corresponding SCR is rendered conductive by the D.C. gating voltage and thereby acts as a rectifier providing a new transformer secondary tap. The circuit thus acts to change the effective turns ratio of the transformer in response to variations in input voltage. When the D.C. gating voltage is removed the corresponding SCR stops conduction on the next zero crossing of the input voltage permitting the rectifier bridge to function once again as the secondary tap. Because the SCRs are gated by D.C. voltage they serve as rectifiers and provide instantaneous input tap changing without the production of ratio frequency noise.

OBJECTS

Accordingly an object of the present invention is to provide a noise free circuit for varying the effective turns ratio of a transformer to prevent variation in output voltage despite variation in A.C. input voltage.

Another object of the present invention is to provide a circuit which produces a controlled output voltage from a variable A.C. input by varying the effective turns ratio of a transformer without generating RF noise.

Another object of the present invention is to provide a transformer secondary with SCR taps which slectively conduct to increase the effective number of turns in the secondary thereby preventing variation in output voltage corresponding with variations in input voltage.

Another object of the present invention is to provide a transformer secondary in which the output voltage thereof is prevented from falling below a prescribed limit by the use of SCR taps off the secondary windings which are D.C. voltage gated to conduct in response to a falling primary voltage thereby increasing the effective number of turns in the secondary to produce a proportionately larger output voltage.

Another object of the present invention is to provide a transformer secondary with various taps containing SCRs which are selectively gated by a D.C. bias voltage to provide for instantaneous tap changing in response to variations in input voltage and to accomplish tap changing without the production of RF energy.

Other objects and many attendant advantages of the present invention will become apparent from perusal of the following detailed description taken in conjunction with the accompanying drawings, wherein the FIGURE is a schematic diagram of a transformer secondary provided with an input tap changer according to the present invention.

DETAILED DESCRIPTION

With more particular reference to the drawings there is shown generally at 1 a preferred embodiment of a circuit according to the present invention which provides for instantaneous tap changing of a transformer secondary the windings of which are illustrated generally at 2. In the embodiment shown the windings 2 are provided with a center tap 4 connected to a first output terminal 6. The center tap can be thought of as a reference voltage tap on either side of which are windings 8 and 10 provided with corresponding taps 12 and 14. The taps 12 and 14 are connected by corresponding diodes CR1 and CR2 the outputs of which join an electrical lead 3 connected through inductor L1 and lead 27 to a second output terminal 16. In the normal operation CR1 and CR2 provide for full wave rectification of the input voltage supplied or produced over the windings 8 and 10. The full wave rectified output voltage across the output terminals 6 and 16 therefore is proportional to the turns ratio of the transformer of which only the secondary windings 2 are illustrated.

Additional windings 18 and 20 on either side of the center tap 4 and the windings 8 and 10 are provided with corresponding taps 22 and 24. The taps 22 and 24 include corresponding silicon control rectifiers SCR1 and SCR2 the cathode electrodes of which are commoned with the output of CR1 and CR2. The cathode electrodes are isolated by corresponding resistors R1 and R2 from the gate electrodes which are series connected through corresponding resistors R3 and R4 to an emitter electrode of a transistor switch Q1. The collector of Q1 is connected with an input terminal 26 to which is connected a D.C. input bias voltage. The base of Q1 is coupled to the collector of a transistor Q2. The collector of Q2 further is connected through resistor R14 to the bias voltage at terminal 26. The emitter of Q2 is connected through lead 27 to lead 3 and also to to the output terminal 16. The base of Q2 is connected to the collector of a photoconducting transistor which forms the output side of an optical isolator AT1. The collector of AT1 further is connected through a resistor R15 to the bias voltage at terminal 26. The emitter of AT1 is connected to the lead 27 and to the output terminal 16. Thus a gate drive circuit is provided by Q1 and Q2.

A choke input filter network is provided by L1 and C1 connected in series parallel with the output terminals 16 and 6 by virtue of their connection with the lead 3 and the center tap 4. A voltage divider circuit is comprised of the series connected resistors R5 and R6 in series with the parallel connected resistors R7 and R8. The voltage divider is effectively connected across the output terminals 6 and 16 by virtue of the connection across the lead 27 and the center tap 4. The base of a transistor Q3 is connected to the junction of R5 and R6. The collector Q3 is coupled first through a resistor R9 to the output terminal 16 and secondly through a resistor R10 to the base of the transistor Q4. The collector of Q4 is connected to the output terminal 16 through a resistor R11 in series with a photo diode 30 which forms the input side of the optical isolator AT1. The emitters of Q3 and Q4 are commoned and are coupled through a resistor R13 to the output voltage terminal 16. Additionally the collectors of Q3 and Q4 are connected to the output terminal 6 through a Zener diode CR3 having a series connected resistor R12 which is selected to provide hysteresis. The presence of hysteresis changes the set point triggering of the Zener diode. Accordingly a Schmidtt trigger with hysteresis is provided by Q3, Q4, R5 through R13 and CR3.

AT1 is an optical isolator which couples the Schmidtt trigger to the SCR gate drive circuit. Q2 and R15 provide a 180° phase shift for a control signal provided by the Schmidtt trigger to the gate drive circuit.

In the normal operation SCR1 and SCR2 are nonconducting and CR1 and SC2 provide a rectifier bridge for full wave rectification of the applied input voltage, producing a corresponding D.C. output voltage at the output terminals 6 and 16. Q3 is normally conducting with Q4 nonconducting or effectively blocked. With Q4 nonconducting the input side of AT1 is off. The corresponding phototransistor of AT1 thereby is nonconducting. Q2 accordingly is conducting removing the bias voltage at terminal 26 from the transistor switch Q1 which is nonconducting. When a variation in input voltage occurs, such as a decrease thereof, a corresponding decrease in voltage is detected across C1. The voltage across R5 also decreases causing Q3 to turn off allowing Q4 to conduct. An output from the photo diode 30 is thereby produced and supplied to the base of the phototransistor rendering the same conductive.

When the phototransistor is conducting Q2 accordingly is turned off and Q1 is turned on to supply the bias voltage at terminal 26 to the gates of SCR1 and SCR2. Since a constant D.C. voltage bias is applied to their respective gates, SCR1 and SCR2 are rendered continuously conductive, acting accordingly as rectifiers and effectively tapping the windings 2 by the taps 22 and 24. Thus as an input voltage variation (decrease) is experienced an instantaneous tap changer is provided upon conduction of SCR1 and SCR2 which varies the effective turns ratio of the transformer in response to the input voltage variation. An input tap changer is provided thereby. Additionally since SCR1 and SCR2 are gated by a constant D.C. voltage, the operation thereof as rectifiers provide for tap changing without producing large amount of RF energy and consequently is noise free during switching. A short duration noise spike is produced if SCR1 and SCR2 are gated on during any time but a zero crossing of the voltage waveform of the input voltage. The noise spike is immediately extinguished, and tap changing is accomplished without the production of repetitive RF energy. Upon conduction of SCR1 and SCR2, CR1 and CR2 are back biased and block at all times. If SCR1 and SCR2 are gated on as the input voltage is at a zero crossing no noise is generated, as the SCRs remain conductive until the voltage across C1 increased to the point at which the voltage at R5 rises sufficiently to cause Q3 to conduct. When Q3 conducts Q4 is rendered nonconductive and the input side (photo diode at AT1) turns off. The phototransistor thereby turns off and Q2 again is rendered conductive to turn off the transistor switch Q1. The gating voltage is removed from the SCRs and the SCRs stop conduction on the next zero crossing of the input voltage to permit CR1 and CR2 to function as a normal center tap full wave bridge.

When SCR1 and SCR2 open or become nonconductive the net effect is to decrease the voltage across C1. This reduction in voltage is insufficient to reset the Schmidtt trigger since the presence of R12 provides sufficient hysteresis to prevent the Schmidtt trigger from oscillating in a dwell condition.

It is possible to provide additional tap changes by increasing the number of SCR pairs and corresponding trigger circuits operating at different set points of sampled voltage, such that a corresponding D.C. bias voltage may be applied to the gates of the additional SCRs to provide additional tap changes.

The circuit described provides for full wave rectification. Half wave rectification can be provided by eliminating the circuit containing CR2, SCR2, R2 and R4 in which case the voltage reference tap 4 is effectively an end winding tap of the secondary windings. Half wave rectification will also be accomplished by alternately eliminating the circuit defined by CR1, SCR1, R1 and R3.

Although a preferred embodiment and modifications thereof are described and illustrated in detail other modifications and embodiments which would be apparent to one having ordinary skill in the art are intended to be covered by the spirit and scope of the appended claims.

What is claimed is:

1. A voltage controlling circuit, comprising:
   a transformer secondary winding provided with a first diode tap and a reference tap connected to corresponding output terminals across which is produced a first output voltage,
   a normally conducting SCR tap on said winding on a location remote from said diode tap,
   a gate of said SCR connected to a source of DC bias voltage through a switch means,
   a base electrode of said SCR coupled to the same one of said output terminals as said diode tap,
   voltage sampling means across said output terminals for sampling output voltage, and
   coupling means connecting said sampling means with said switch means and being responsive to a change in output voltage to close said switch means and supply said bias voltage to said gate rendering said SCR conductive thereby changing the secondary winding effective tap from said diode tap to said SCR tap,
   said voltage sampling means including a Schmidtt trigger having a Zener diode and a hysteresis resistor in series with each other,
   said coupling means including a photo diode connecting said Schmidtt trigger with one of said output terminals, and
   a photo conducting transistor coupling said switch means and one of said output terminals, said photo conducting transistor being optically coupled to said photo diode.

2. The structure as recited in claim 1, and further including:
   a rectifier connected between said first tap and a corresponding one of said output terminals.

3. The structure as recited in claim 1, wherein, said reference tap is located at one end of said secondary winding.

4. The structure as recited in claim 1, said reference tap is connected centrally of said secondary winding,
   said SCR tap is connected to an end of said secondary winding, and
   said first diode tap is connected to said secondary winding between said reference tap and said SCR tap.

* * * * *